W. C. HEDGCOCK.
BEAM FOR BRAKES.
APPLICATION FILED AUG. 31, 1918.
Reissued Oct. 1, 1918.
14,525.
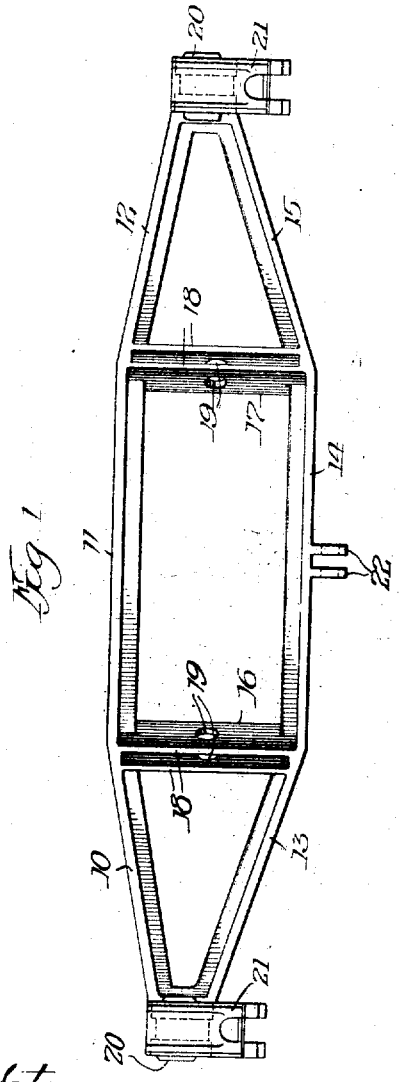
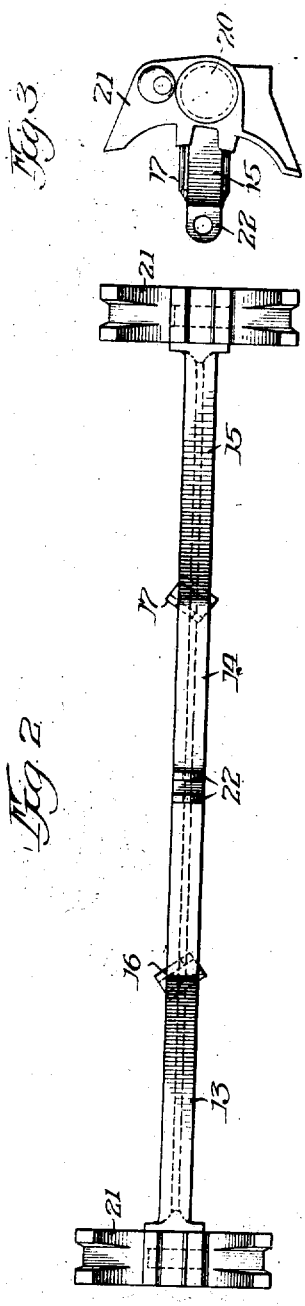
Witnesses:
Geo. C. Dixson
Chas. L. Byron
Inventor
William C. Hedgcock.
By Wilkinson & Huxley
Attys.

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BEAM FOR BRAKES.

14,525. Specification of Reissued Letters Patent. Reissued Oct. 1, 1918.

Original No. 1,274,163, dated July 30, 1918, Serial No. 178,583, filed July 5, 1917. Application for reissue filed August 31, 1918. Serial No. 252,505.

*To all whom it may concern:*

Be it known that I, WILLIAM C. HEDGCOCK, a citizen of the United States, and resident of Chicago, in the county of Cook and State of Illinois, have invented certain new and useful Improvements in Beams for Brakes, of which the following is a specification.

This invention relates to railway brakes and more particularly to brake beams or bars.

In the use of certain types of brake arrangements it is common to provide brake riggings which are duplicated on each side of the truck whereby the pull is applied equally on the brake heads.

One of the objects of this invention is to provide a brake beam adapted for the use referred to which shall combine the elements of simplicity and adaptability, and which shall in addition provide novel attaching means for the reception of brake levers.

Another object of the invention is to provide a brake beam adapted to meet the various requirements for successful commercial operation.

These and other objects are accomplished by providing a brake beam comprising a bar having spaced members terminating in mountings at its ends for brake heads, and angularly arranged lever fulcrums extending between said spaced members.

The invention is illustrated on the accompanying sheet of drawings, in which,

Figure 1 is a plan view of my brake beam;
Fig. 2 is an elevation of the same, and,
Fig. 3 is an end view of the same beam.

The various features of the invention will be apparent from the following description and drawings, and will be particularly pointed out in the appended claims.

The beam is illustrated in its association with a car truck in my co-pending application, Serial No. 178,585, filed July 5, 1917.

The beam comprises compression members 10, 11 and 12 of substantially T-cross section and tension members 13, 14 and 15 of the same cross section. The compression and tension members are not necessarily restricted to a T-cross section, but they may have other cross sections and not necessarily the same for both members. The tension members are spaced apart by two lever fulcrums 16—17, each of which includes two angularly arranged portions 18, extending between the compression and tension members and having registering openings 19, through which a pin may pass to pivotally connect to the lever fulcrum a brake lever (not shown). The middle portions of 11 and 14 of the tension and compression members are parallel to each other and opposite ends of the beam members converge outwardly, terminating in trunnions or mountings 20 for the reception of brake hangers or brake heads 21.

The middle tension member 14 is provided with centrally arranged spaced ears 22 for the attachment of a third point supporting hanger. The tension and compression members, lever fulcrums, and trunnions of the beam are preferably integrally formed, however, not necessarily so. The lever fulcrums are arranged angularly for the purpose of receiving angularly arranged brake levers, shown in the application hereinabove referred to for the purpose of permitting greater clearance for radial action of the truck and underframe, which is essential when the truck swivels, as in rounding a curve.

It is apparent that there may be modifications of the beam herein particularly shown and described, and it is my intention to cover all such modifications which do not involve the departure from the spirit and scope of my invention as set forth in the following claims.

I claim:

1. A brake beam, comprising a bar having spaced members and terminating in mountings at its ends for brake heads or hangers, and a pair of lever fulcrums extending between said spaced members.

2. A brake beam, comprising a bar having spaced members and terminating in trunnions for brake heads or hangers, and a pair of angularly arranged lever fulcrums extending between said spaced members.

3. A brake beam, comprising a bar having spaced members and terminating in trunnions for brake heads or hangers, and a pair of lever fulcrums extending between said spaced members, each lever fulcrum comprising two spaced angularly arranged portions.

4. A brake beam, comprising a bar having tension and compression members terminating in trunnions at its ends, and angularly arranged fulcrum members extending between said tension and compression members.

5. A brake beam, comprising a bar having spaced tension and compression members terminating in trunnions for reception of brake heads or hangers, spaced angularly arranged lever fulcrums extending between said tension and compression members, and an intermediate lug carried by one of said members providing for an attachment of a supporting device.

6. A brake beam, comprising a bar having spaced members, intermediate portions of which are parallel and the outer portions of which converge outwardly and terminate in trunnions for the reception of brake heads or hangers, and angularly arranged lever fulcrums extending between said spaced members.

7. A brake beam, comprising a bar having spaced members, intermediate portions of which are parallel, the outer portions of which converge and terminate in mountings for brake heads or hangers, lever fulcrums extending between the parallel portions of the spaced members, and a lug carried by one of the parallel arranged members provided for the attachment of a supporting device.

Signed at Chicago, Illinois, this 30th day of June, 1917.

WILLIAM C. HEDGCOCK.

Witnesses:

AMANDA F. WADE,

CHAS. L. BYRON.